March 6, 1951
J. C. YEDLICKA
2,544,478
HANDLING AND PAYOFF APPARATUS
FOR COILED STRAND MATERIAL
Filed May 18, 1948
4 Sheets-Sheet 4
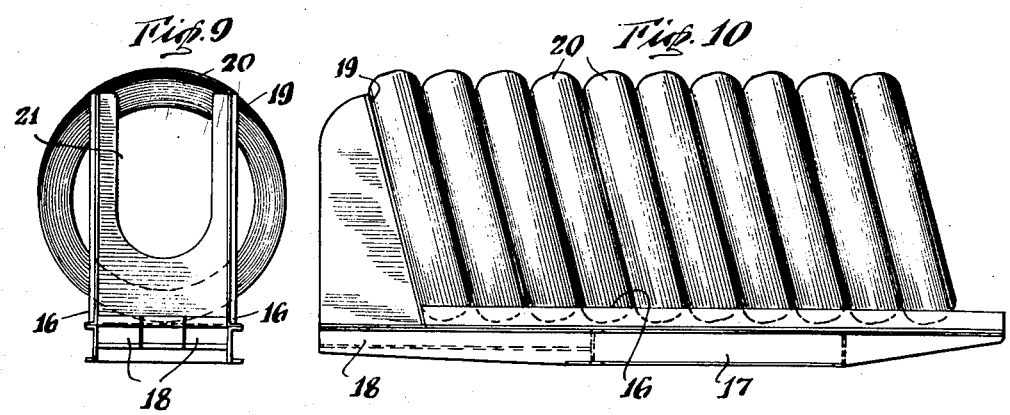
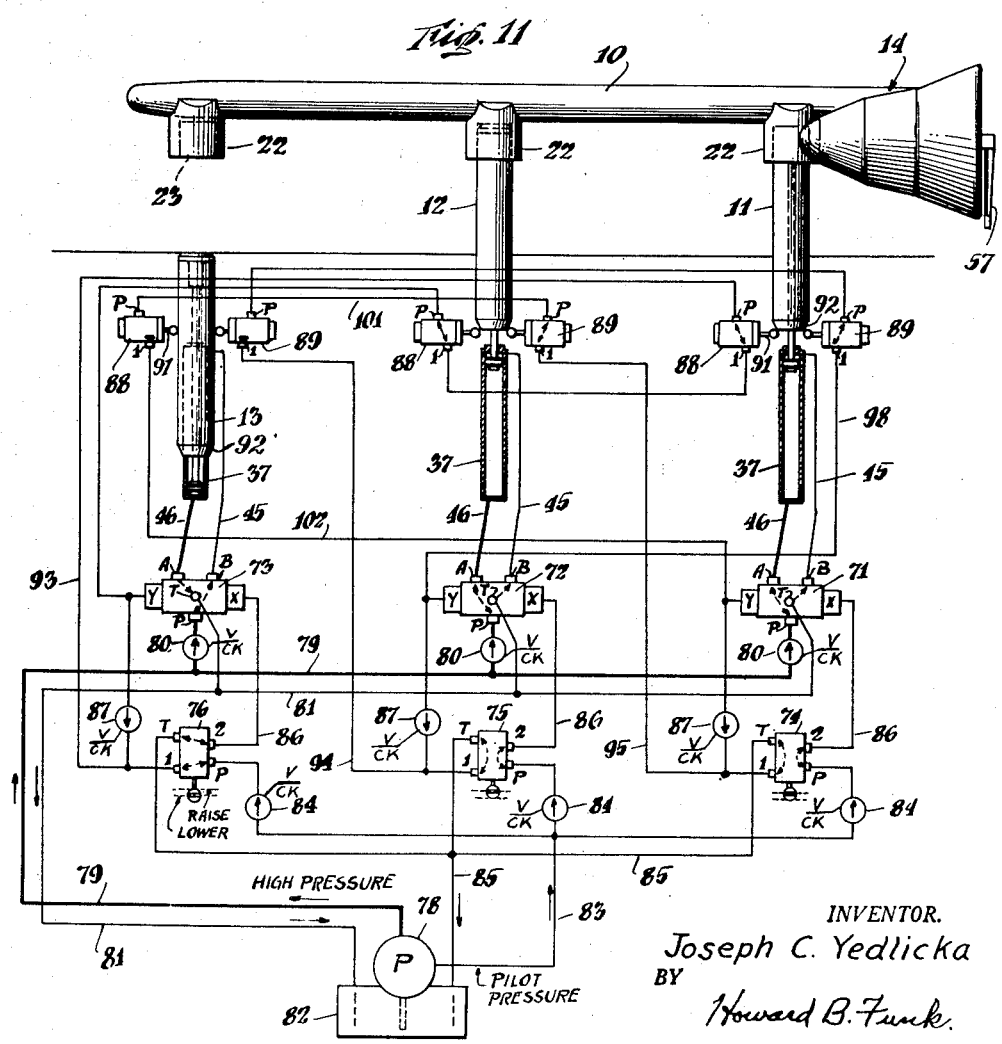
INVENTOR.
Joseph C. Yedlicka
BY
Howard B. Funk
ATTORNEY Patented Mar. 6, 1951

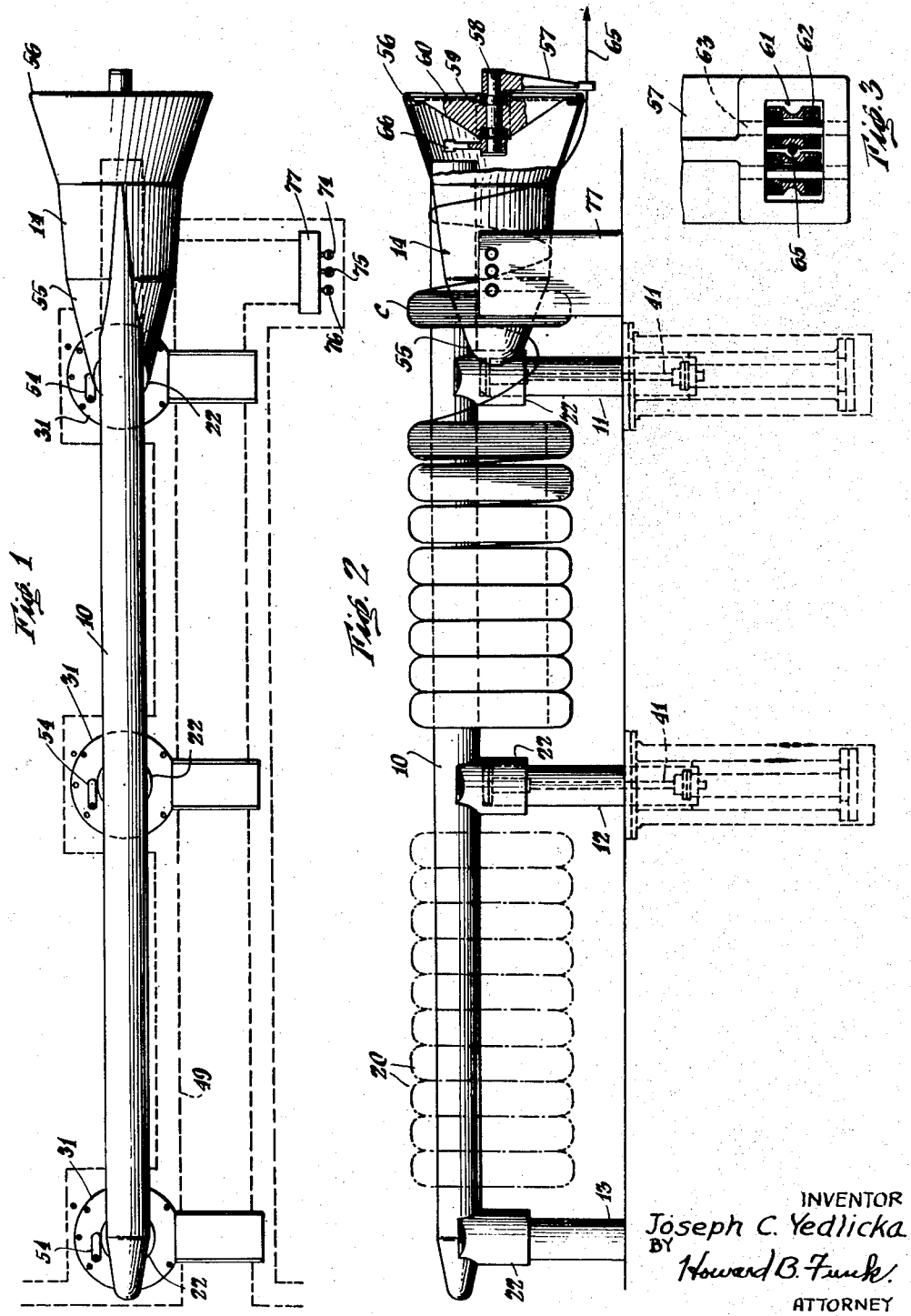

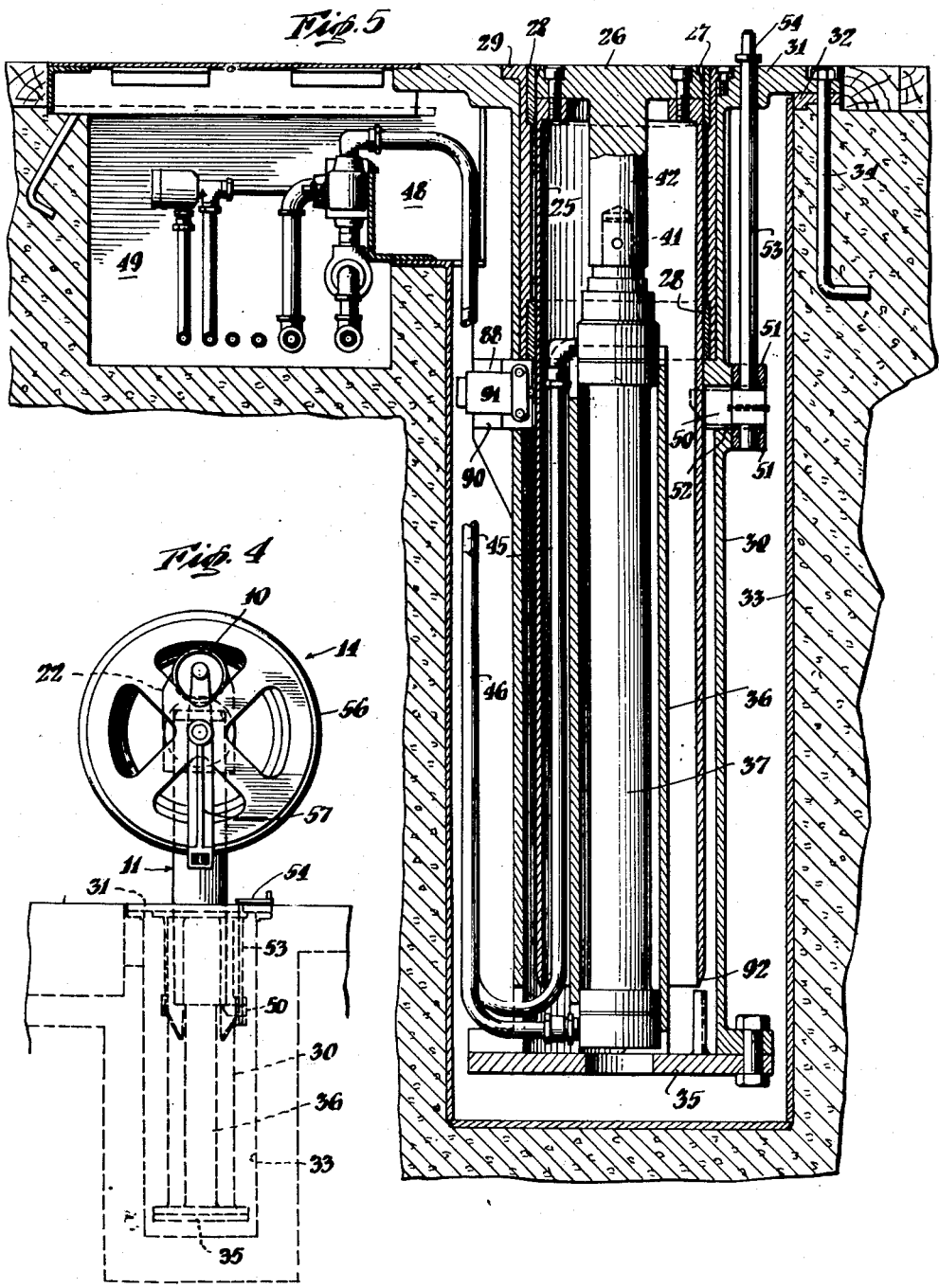

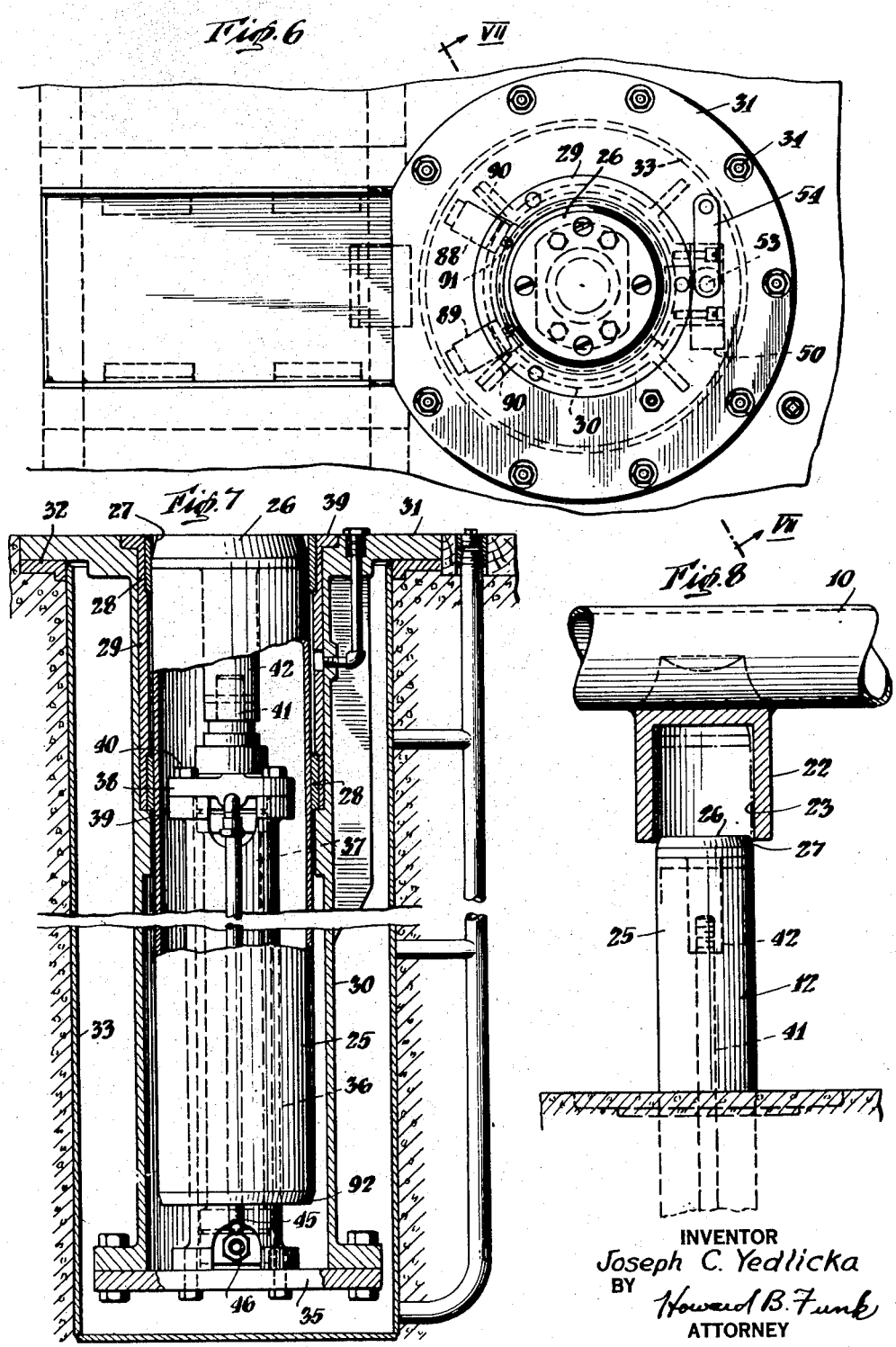

2,544,478

UNITED STATES PATENT OFFICE 2,544,478

HANDLING AND PAYOFF APPARATUS FOR COILED STRAND MATERIAL

Joseph C. Yedlicka, Massena, N. Y., assignor to Aluminum Company of America, Pittsburgh, Pa., a corporation of Pennsylvania Application May 18, 1948, Serial No. 27,713

15 Claims. (Cl. 242—128)

This invention relates, as indicated, to apparatus for handling coiled strand material and its continuous payoff and delivery to strand processing mechanism and is primarily concerned with payoff apparatus for continuously supplying wire or rod for annealing, drawing or other processing.

One object of the invention is to provide practical and efficient payoff mechanism for effecting continuous axial payoff of strand material from successive coils.

Other objects of the invention are to provide improved apparatus for handling strand material in multiple coil unit loads and for supplying a continuous length therefrom with structural simplicity and ruggedness in the apparatus and with positive axial withdrawal of the strand or wire without snarling or entanglement of loops pulled free or separated from a coil during payoff.

A further object is to provide an improved type of continuous payoff incorporating an elongated coil supporting member and retractable supporting devices therefor which permits of mechanical handling and loading of wire coils and the like from its one end, subsequent welding of the coils into a continuous length and movement of the coils as needed into payoff position at the other end of the supporting member.

Still another object of the invention is to provide, in the type of payoff referred to, an operating mechanism for the retractable supporting devices interlocked with respect to each other for rendering the operation thereof mutually dependent upon each other.

Further objects of the invention will become apparent from the detailed description of a preferred form thereof taken in conjunction with the accompanying drawings wherein Fig. 1 is a plan view; Fig. 2 is a side view partly in section of an apparatus embodying the invention; Fig. 3 is a constructional detail view partly in section of a portion of the apparatus of Fig. 2; Fig. 4 is an end elevational view looking from the right-hand end of Fig. 2; Fig. 5 is a vertical transverse sectional view on an enlarged scale of one of the retractable supports of Fig. 2, but showing the support in the retracted position; Fig. 6 is a plan view of the apparatus of Fig. 5; Fig. 7 is a view taken on the line VII—VII of Fig. 6; Fig. 8 is a sectional elevational view on an enlarged scale illustrating a portion of the coil supporting beam and one of the supporting devices therefor in partly retracted position; Figs. 9 and 10 are end and side views respectively showing a coil pallet loaded with coils preliminary to threading the same onto the structure of Fig. 2 and Fig. 11 is a diagrammatic view illustrating the control mechanism.

Referring to Figs. 1, 2 and 3, the apparatus, generally stated, comprises a substantially horizontally disposed coil supporting member or beam 10 of considerable length, a plurality of retractable supporting devices 11, 12 and 13 preferably vertically reciprocable legs or plungers adapted to support beam 10 in an elevated position, and a payoff head indicated by the numeral 14 integral with one end of the beam 10. A minimum of three supporting devices are provided for the beam, one disposed substantially central of the beam, another near the loading end of the beam and the third one adjacent the inner end of the payoff head 14 (as shown in Fig. 2). These retractable supports are individually movable into and out of supporting engagement with the beam, any two of them always being maintained in beam supporting relationship. As a result, the outmost support 13 may be retracted to permit threading of a load of coils onto the beam directly from a coil carrier without manual lifting of individual coils. Then the other supports may, in turn, be retracted to permit movement of the coils along the beam into payoff position at the head 14.

Loading may efficiently be accomplished by the use of a coil pallet as illustrated in Figs. 9 and 10. The pallet is provided with a pair of horizontal coil supporting rails 16 secured to a suitable framework 17 which, in turn, is provided with elongate openings 18 for entry of the prongs of a power actuated lift or fork truck well-known in the art. Above the openings 18, the pallet is provided with an upstanding but backwardly inclined supporting wall 19 against which coils seated on the supporting rails 16 rest in inclined position. The coils 20, as produced or as removed from storage, may be loaded onto the pallet in side-by-side relation as indicated in Fig. 10. The supporting plate 19 is provided with a cutout portion 21 forming an open passageway in conjunction with the centers of the coils. The load of coils may be brought to the payoff apparatus by the fork truck and then by simply lining up the axis of the load of coils with the axis of beam 10, the load may be threaded onto the beam after which the forks of the truck and pallet are lowered thereby depositing the coils on the beam 10, as indicated by the broken lines in Fig. 2. The fork truck and pallet may then be backed away from the payoff device so that the support 13 may be raised into supporting engagement with the beam 10. The pallet, of course, may be taken to a source of supply to receive additional coils and the truck will be free for general use until a new load of coils is needed at the payoff.

The beam 10 is preferably in the form of a hollow tube or pipe of sufficient wall thickness and diameter adequately to support the load of coils 20 disposed thereon without undue deflection. The upper coil contacting surface of the beam is preferably highly polished in order to avoid damage to the wire surfaces during sliding movement of the coils along the beam into payoff position adjacent the payoff head 14. Other cross sectional shapes of beam, of course, may be employed, as desired. On its underside and aligned with the supports 11, 12 and 13, the beam is provided with three downwardly extending socket members 22 in the socket 23 of each is received the upper end of the associated retractable support. The sockets 23 are made of sufficient axial length such that when engaged by the supports rocking and tilting of the beam will be prevented, the provision of flat surface seating between the supports and the sockets reducing tendency of the beam to rock.

Each of the retractable supports preferably comprises a vertical tubular plunger 25 having secured to the upper end thereof a flat top seating head 26. The periphery of the head 26 is bevelled as indicated at 27 to facilitate its entry into the socket 23 of the socket member 22, as more clearly illustrated in Fig. 8. The plunger 25 is slidably supported on bearing bushings 28 vertically spaced with respect to each other and carried by bushing holder 29. The bushing holder 29 is mounted in the upper end of a supporting casing 30 having annular supporting flange 31 integrally formed at its upper end. Flange 31 is seated upon a floor ring 32 with its upper face flush with the level of the floor. The floor ring 32 is integral with the upper end of a cylindrical shell 33 sunk in and forming a peripheral wall of a concreted pit. Anchor rods 34 are embedded in the concrete and extend through the floor ring 32 and flange 31 for the reception of fastening nuts to hold casing 30 rigidly in vertical position.

A bottom plate 35 is secured to the lower end of the casing 30 and it supports co-axially of the casing an upstanding tubular support 36 in which is disposed hydraulic cylinder 37. The upper end of the hydraulic cylinder 37, as shown more clearly in Fig. 7, is provided with lateral flanges 38 which rest on similar flanges 39 integral with the upper end of the support 36, attaching bolts 40 extending through the flanges to rigidly connect the cylinder and the support. Piston rod 41 extends upwardly from the cylinder 37 and has screw threaded connection with dependent stem 42 of the plunger head 26.

From the foregoing description, it will be observed that a self-contained and compact operating unit is provided for cooperation with each of the socket members 22 and that the telescopic relation of the cylinder 30 and plunger 25 materially reduces the axial length of the operating unit and the depth of the pit to accommodate the same. Moreover, the plunger 25 is vertically supported independently of the operating cylinder 37, thereby removing lateral supporting forces from the cylinder 37 and permitting the use of a small volume cylinder to actuate the plunger.

When the plunger 25 is moved upwardly into beam supporting position, it easily enters the socket 23 by virtue of the bevelled periphery provided on its upper end. Pre-shaped conduits 45 and 46 are connected to opposite ends of cylinder 37, as shown in Fig. 5, conduit 45 extending downwardly in the space between plunger 25 and support 36, to clear the lower end of the plunger in its lowermost position, and outwardly through a cutout in the wall of casing 30. From this point, conduits 45 and 46 extend upwardly exteriorly of casing 30 to a lateral passage 48 which communicates the upper end of the pit with a trench 49 interconnecting each of the pits of the payoff installation. The various pipes and fluid conduits may be located in the trench 49 as indicated in Fig. 5.

To support the plunger 25 in beam supporting position independently of the cylinder 37, a locking dog 50 is provided for movement into and out of position under the lower edge of the plunger. The locking dog is mounted between journal bearings 51 secured to pads formed on the side of casing 30 with a window 52 formed in the wall of the casing 30 (Fig. 5). The locking dog 50 is keyed to a vertical rod 53 that is rotatably mounted in the journal blocks 51. The rod extends through the flange plate 31 and carries a crank handle 54 by means of which the locking dog may be turned into and out of locking position. When the plunger is raised and the locking dog is in locking position therebeneath, the lower end of the plunger 25 seats on the locking dog and is held thereby against downward movement. Each of the retractable supports 11, 12 and 13 are of the construction above described.

Referring to Fig. 2, after placing a load of coils 20 on the beam 10, as hereinabove described support 12 may be retracted so that the coils can be slid either one at a time or in a group by the operator to the beam section intermediate supports 11 and 12, as indicated in full lines in Fig. 2. Support 12 will then be moved up to its beam supporting position and support 11 retracted. The foremost coil then may be slid along the beam into coil unwinding position adjacent the inner end of the payoff head 14. Support 11 may then be raised into beam supporting position. If desired at this time, a second load of coils may be placed on the section of beam between supports 12 and 13.

The payoff head 14 is designed to control and promote smooth axial delivery or withdrawal of the wire from the coil indicated at C without snarling or entanglement of any loops of wire which are drawn out from the body of the coil during unwinding. Preferably, the payoff head 14 is of bell or cone-shape with its axis eccentric to the axis of beam 14 to such an extent that its axis is substantially co-axial with that of the coils. The head 14 embraces the exterior wall of the beam 10 and is suitably secured thereto, as by welding, and the inner conical end 55 of the head is welded to the adjacent socket member 22. At its outer end, the head is provided with an annular rim 56 preferably of greater diameter than that of the loops of wire in the coils to be unwound, the walls of the head flaring outwardly along a smooth line to the periphery of the rim 56. The reason for this is that the loops of wire pulled away from the coil are prevented from moving beyond the end of the payoff head until they are actually expanded to a diameter in excess of that of the base rim 56. This expansion is effected by means of a rotary cast-off arm 57 that is secured to shaft 58 journalled in bearings 59 carried by end plate 60 that is secured within the rim 56. The outer end of the cast-off arm 57, as shown more clearly in Fig. 3, is provided with a window 61 in which is disposed opposed grooved rollers 62 journalled on pins or shafts 63. Between them the rollers 62 form a roller eye through which the strand of wire 65 is threaded and passes to a wire drawing machine (not shown) for example. Pull exerted on wire 65 will cause the cast-off arm to rotate about the axis of the head 14 thereby smoothly expanding and paying off the wire. A counterweight arm 66 secured to the inner end of shaft 58 counterbalances the cast-off arm.

In operation, a load of coils consisting of perhaps 10 coils, each coil weighing several hundred pounds or more, for example, is brought to the payoff and the coils threaded over the rear end of the beam after the rear support 13 has been moved down out of the way, as heretofore described. After moving the support 13 into its beam supporting position, the central support 12 is retracted so that the coils may be pushed singly or in groups to a position between the central support 12 and the forward support 11. After raising the central support, the forward support 11 may be lowered and the leading or foremost coil pushed along the beam into a position encircling the payoff cone 14. At this time the front support 11 may be raised into beam supporting position. The outer end of this foremost coil will be threaded through the eye of the cast-off arm 57 and passed to the wire drawing machine or other apparatus to which the wire is to be delivered. During unwinding or previously, the innermost end of this coil will be welded to the outer end of the succeeding coil and the same will be done to each of the coils to provide a series of connected coils on the beam. Thus when one coil is nearly completely paid off, it is merely necessary to lower support 11 and push the next coil forwardly into unwinding position thereby continuous payoff of the wire is accomplished with minimum labor and manual handling of the coils involved in the operation. At any time after one batch of coils has been pushed into position between the foremost and the central beam supports, the rearmost support 13 may be lowered and a second batch or load of coils loaded onto the beam as heretofore described in readiness for movement, in turn, along the beam.

With reference to Fig. 11, the control system for the device comprises pilot operated 4-way reversing valves 71, 72 and 73 for the retractable supports 11, 12 and 13, respectively, to the outlet ports A and B of which the conduits 45 and 46 of the cylinders 37 of the respective supports or plungers are connected. Manually actuated 4-way pilot or control valves 74, 75 and 76 are provided for remotely controlling the operation of valves 71, 72 and 73, respectively. The valves 74, 75 and 76 may be mounted in a control cabinet 77 conveniently disposed adjacent the payoff device as shown in Figs. 1 and 2. As shown in Fig. 11, supports 11 and 12 are in raised position whereby the associated reversing valves 71 and 72 have pressure ports P communicating with ports A and exhaust ports T communicating with ports B as indicated in dotted lines, and the pilot valves 74—75 therefor are in depressed or plunger "raise" position with their ports P in communication with ports 2 and ports T in communication with ports 1, as indicated. Support 13 is in retracted position whereby its reversing valve 73 is in reversed position with respect to the pressure and tank line connections to ports A and B, as indicated by dotted lines, as likewise are the connections at the pilot valve 76, as indicated by dotted lines, by reason of valve 76 being in extended or plunger "lower" position. Fluid pressure from a suitable source, such as pump 78, is delivered through conduit 79 and past check valves 80 to each of the pressure ports P of valves 71, 72 and 73, the exhaust ports T of these valves being connected to tank line 81 extending back to tank 82. From the pump, pilot pressure at a lower pressure than the operating pressure is conducted through conductor 83 past check valves 84 to each of the ports P of the pilot valves 74, 75 and 76, the ports T of these valves being connected with return line 85 leading back to tank 81.

Through a pilot circuit 86, port 2 of each pilot valve is connected directly to end X of the associated 4-way reversing valve to apply pilot operating pressure thereto so as to actuate the same into position to effect raising of the associated plunger. The port 1 of each pilot valve is connected through check valve 87 to the end Y of the associated 4-way reversing valve thus providing a direct exhaust circuit therebetween, but direct pilot pressure flow from port 1 to point Y is prevented. However, pilot pressure on point Y of each of the reversing valves actuates the valve into position to effect lowering of the associated plunger, the pressure being applied through an interlocked pilot circuit as hereinafter described.

Associated with each of the retractable supporting members or plungers are auxiliary valves 88 and 89 that are mounted on suitable wings or pads 90 formed on the supporting casing 30. A window is formed in the wall of the casing 30 between the mounting pads 90 and the operating stems 91 of the valves, carrying rollers on their inner ends, extend through this window and are adapted to bear against the plunger 25. Cam surface or bevel 92 is formed on the lower ends of the plungers 25. When the plungers are in fully raised position and set on the locking blocks 50, their lower ends are disposed just above the stems 91 of the valves 88 and 89 and permit the spools thereof to be projected outwardly by biasing springs incorporated in the valves. In this extended position, as shown in Fig. 11, the ports P and 1 of the valves 88 and 89 are in communication. Whenever lowering of a plunger is effected, the cam surface 92 on its lower end pushes the valve stems 91 inwardly whereby the flow through the valves is blocked off at ports 1, as indicated on valves 88—89 of lowered support 13 (Fig. 11). Valves 88—89 are well known types of spring biased 2-way valves.

These valves are employed to render the operation of the reversing valves in plunger lowering direction mutually dependent upon plunger position so that all three plungers must be in beam supporting position before any one of them can be retracted. To this end, control valve 76 is provided with a pilot circuit 93 that extends from port 1 of valve 76 serially through auxiliary valves 88 of plungers 11 and 12 to point Y of the reversing valve 73 for plunger 13. It will be observed that by reason of this series or interlocking circuit, pilot pressure cannot be placed on point Y of valve 73 to actuate the same in a direction to effect lowering of support 13 if either of the supports 11 or 12 are in lower position. A similar interlocking circuit 94 is provided between pilot valve 75 and associated reversing valve 72 which, it will be seen, extends from port 1 of valve 75 serially through valves 89 of plungers 13 and 11 to point Y of reversing valve 72. In the same manner, port 1 of the valve 74 is connected through pilot circuit 95 extending in series through valves 89 and 88 of plungers 12 and 13, respectively, to point Y of reversing valve 71. At this time it will be noticed from Fig. 11 that since support 13 is in lower position, ports 1 of the interlock valves 88—89 associated therewith are blocked so that pilot pressure cannot be applied to either of the reversing valves 72 or 71 thereby positively preventing either accidental or deliberate attempt to lower either support 12 or 11. The only way either support 11 or 12 can be lowered is by first operating control valve 76 into support "raise" position whereby pilot pressure is applied through the pilot circuit 86 to point X of reversing valve 73 whereby its spool is shifted to the opposite position for flow of fluid pressure through ports P—A and connection 46 to the underside of cylinder 37 and exhaust of pressure from the upperside of the cylinder through connection 45 and ports B—T whereby the support or plunger 13 will be moved up into beam supporting position. When fully raised, the spools of the interlocking valves 88—89 are projected so as to unblock ports 1 thereof and thereby permit either one of the pilot operating circuits of the other reversing valves 72 and 71 to be operated at will. When in fully raised position, the locking dog 50 will be manually actuated by the operator into locking position with respect to the plunger so that there will be no danger of accidental lowering of the plunger in case of loss of hydraulic pressure.

The term "wire" as used herein comprehends strand material such as wire, rod, and the like of circular and other cross sectional shape, for example square or hexagonal, and ordinarily formed into coils.

From the foregoing it will be appreciated that a practical and efficient payoff mechanism enabling handling of large quantities of wire stock is provided with positive payoff of the wire in a continuous length free from snarls and kinks and with minimum of manual handling of the coils or bundles of wire. While certain specific elements have been described, it will be manifest that various modifications and substitutions may be resorted to, for example, suitable motor actuated jacks may be employed as retractable supports, if desired. It will be understood that such modifications may be employed without departing from the spirit and scope of the invention as defined in the appended claims.

What is claimed is:

1. In apparatus for handling coiled strand material, an elongated coil supporting member, a device at one end of said member for controlling axial withdrawal of the strand from an adjacent coil supported on said member, and at least three retractable supporting devices located at spaced points along said member and supportingly engaging the member to hold the same in a raised substantially horizontal position, each of said supporting devices being movable away from said member to permit loading of coils onto said member and their movement therealong into unwinding position adjacent said control device.

2. In apparatus for handling coiled strand material, an elongated coil supporting member, a payoff device of conical form secured to one end of said member for controlling axial withdrawal of the strand from an adjacent coil, and at least three retractable supporting devices located at spaced points along said member and supportingly engaging the member to hold the same in a raised substantially horizontal position, each of said supporting devices being movable away from said member to permit loading of coils onto said member and their movement therealong into unwinding position adjacent said control device.

3. In apparatus as defined in claim 2 wherein said payoff device is disposed eccentrically of said supporting member and substantially co-axially of the axis of the coils supported on said member.

4. In apparatus as defined in claim 2 wherein said payoff device is disposed eccentrically of said supporting member and substantially co-axially of the axis of the coils supported on said member, and a rotary cast-off arm rotatably mounted co-axially of said payoff device and having an eye therethrough for guiding the strand material during withdrawal thereof.

5. In apparatus for handling coiled strand material, an elongated coil supporting member, a device at one end of said member for controlling axial withdrawal of the strand from an adjacent coil supported on said member, at least three retractable supporting devices located at spaced points along said member and supportingly engaging the member to hold the same in a raised substantially horizontal position, each of said supporting devices being movable away from said member to permit loading of coils onto said member and their movement therealong into unwinding position adjacent said control device, and means including a locking member for each of said supporting devices movable into locking engagement therewith to hold the same against retractive movement with respect to said supporting member.

6. In apparatus for handling coiled strand material, an elongated coil supporting member, device at one end of said member for controlling axial withdrawal of the strand from an adjacent coil supported on said member, at least three retractable supporting devices located at spaced points along said member and supportingly engaging the member to hold the same in a raised substantially horizontal position, a power actuator for each of said supporting devices for effecting individual actuation thereof into and out of supporting engagement with said supporting member, to permit loading of coils onto said member and their movement therealong into payoff position adjacent said control device for axial payoff therefrom, and means for controlling the operation of each said power actuator.

7. In apparatus for handling coiled strand material, an elongated coil supporting member, a device at one end of said member for controlling axial withdrawal of the strand from an adjacent coil supported on said member, at least three retractable supporting devices located at spaced points along said member and supportingly engaging the member to hold the same in a raised substantially horizontal position, a power actuator for each of said supporting devices for effecting individual actuation of the latter into and out of supporting engagement with said supporting member, to permit loading of coils onto said member and their movement therealong into payoff position adjacent said control device for axial payoff therefrom, and means for controlling the operation of each said power actuator, said control means including interlocking elements associated with and actuated by said supporting devices upon movement of any one of them out of supporting engagement with said supporting member to prevent operation of the other supporting devices out of supporting engagement with said supporting member.

8. In apparatus for handling coiled strand material, an elongated coil supporting beam, a conical payoff head secured to one end of said beam substantially co-axially of coils supported on said beam, a rotary cast-off arm at the discharge end of said head to guide the strand material during axial withdrawal, three socket members secured at spaced intervals to the lower side of said beam, each having a downwardly open socket formed therein, and a vertical reciprocable support axially aligned with each socket member for movement into and out of the socket thereof, said supports when raised serving to support said beam in substantially horizontal position and when lowered in sequence permitting loading of coils onto said beam and their movement therealong into payoff position adjacent said head.

9. In apparatus for handling coiled strand material, an elongated coil supporting beam, a conical payoff head secured to one end of said beam substantially co-axially of coils supported on said beam, a rotary cast-off arm at the discharge end of said head to guide the strand material during axial withdrawal, three socket members secured at spaced intervals to the lower side of said beam, each having a downwardly open socket formed therein, a vertical reciprocable support axially aligned with each socket member for movement into and out of the socket thereof, said supports when raised serving to support said beam in substantially horizontal position and when lowered in sequence permitting loading of coils onto said beam and their movement therealong into payoff position adjacent said head, bearing means slidably supporting each said reciprocable support, and reversible power means for each said reciprocable support to actuate the same relatively to its associated socket member.

10. In apparatus for handling coiled strand material, an elongated coil supporting beam, a conical payoff head secured to one end of said beam substantially co-axially of coils supported on said beam, a rotary cast-off arm at the discharge end of said head to guide the strand material during axial withdrawal, three socket members secured at spaced intervals to the lower side of said beam, each having a downwardly open socket formed therein, a vertical reciprocable support axially aligned with each socket member for movement into and out of the socket thereof, said supports when raised serving to support said beam in substantially horizontal position and when lowered permitting loading of coils onto said beam and their movement therealong into payoff position adjacent said head, bearing means slidably supporting each said support, reversible power means for each said support to actuate the same relatively to its associated socket member, and interlocking means associated with each said support for actuation thereby and interconnected with the reversible power means of the other reciprocable supports to permit operation of any one of the reversible power means to lower its support only when the other supports are up in beam supporting position.

11. Handling and payoff apparatus for wire coils and the like comprising an elongated coil supporting beam, a conical payoff head secured to one end of said beam substantially co-axially of coils supported on said beam, a rotary cast-off arm at the discharge end of said head to guide the wire during axial withdrawal, three socket members secured at spaced intervals to the lower side of said beam, reciprocable plungers cooperable with said socket members to support said beam in substantially a horizontal position, a power cylinder for each of said plungers to actuate the same, and means for supporting each of said plungers for vertical sliding movement independently of its associated power cylinder comprising a vertical casing, bearing means mounted in said casing and including upper and lower bearing bushings in bearing engagement with the periphery of the plunger, said plungers being individually lowered to permit loading of coils onto the beam and their movement therealong into position adjacent said payoff head for axial payoff therefrom.

12. Apparatus as defined in claim 11 further characterized by the provision of flat seating surfaces between said plungers and said socket members to minimize rocking of said beam laterally with respect to said plungers.

13. Handling and payoff apparatus for wire coils and the like comprising an elongated coil supporting beam, a conical payoff head secured to one end of said beam substantially co-axially of coils supported on said beam, a rotary cast-off arm at the discharge end of said head to guide the wire during axial withdrawal, three socket members secured at spaced intervals to the lower side of said beam, reciprocable tubular plungers cooperable with said socket members to support said beam, vertical supporting casings receiving said plungers individually and supporting the same for vertical movements, each plunger having a head at its upper end, a centrally disposed upstanding tubular support in each of said casings and secured to the lower end thereof in spaced telescopic relation to the tubular plunger, and a power cylinder secured in said tubular support and operatively connected to the head of the plunger to raise and lower the plunger.

14. Handling and payoff apparatus for wire coils and the like comprising an elongated horizontally disposed coil supporting beam, a conical payoff head secured to one end of said beam substantially co-axially of coils supported on said beam, a rotary cast-off arm at the discharge end of said head to guide the wire during axial withdrawal, three socket members secured at spaced intervals to the lower side of said beam, reciprocable plungers cooperable with said socket members to support said beam, a hydraulic cylinder for each of said plungers to raise and lower the same, said plungers being individually lowered to permit loading of coils onto the beam and their movement therealong into payoff position adjacent said payoff head, a remotely controlled reversing valve for each cylinder, to control flow of fluid pressure thereto, separate valve controlled pilot circuits for each reversing valve to actuate the latter selectively in directions to effect raising and lowering of the associated plunger, and auxiliary valves controlled by each plunger for fluid flow therethrough only when the plunger is in raised position, that pilot circuit of each reversing valve by which lowering of the associated plunger is effected being connected in series with auxiliary valves of the other plungers respectively, whereby all three plungers must be in raised position before any one of them can be lowered.

15. In a wire coil payoff, a horizontally disposed elongated beam for supporting a series of connected coils thereon for movement into payoff position adjacent one end of the beam, a device at said payoff position for controlling axial withdrawal of the wire from an adjacent coil, at least three vertically movable leg members substantially equally spaced lengthwise of said beam for supporting the same on their upper ends in an elevated position wherein said coils are supported only by said beam, socket members integral with said beam for receiving the upper ends of said leg members, and a power actuator for each of said leg members for individually raising and lowering the same with respect to said beam.

JOSEPH C. YEDLICKA.

REFERENCES CITED

The following references are of record in the file of this patent:

UNITED STATES PATENTS

| Number | Name | Date |
|---|---|---|
| 1,677,167 | Borgeson | July 17, 1928 |
| 1,728,915 | Blankenship et al. | Sept. 24, 1929 |
| 2,102,610 | Blashill | Dec. 21, 1937 |
| 2,202,204 | Hogue | May 28, 1940 |